Sept. 24, 1968  T. COOR ET AL  3,403,336
METHOD AND APPARATUS FOR PERIODICALLY CALIBRATING A
PRECISION POTENTIOMETER
Filed June 21, 1965  2 Sheets-Sheet 1

INVENTORS
THOMAS COOR &
ROBERT F. HERRMAN
BY Murray J. Ellman
ATTORNEY

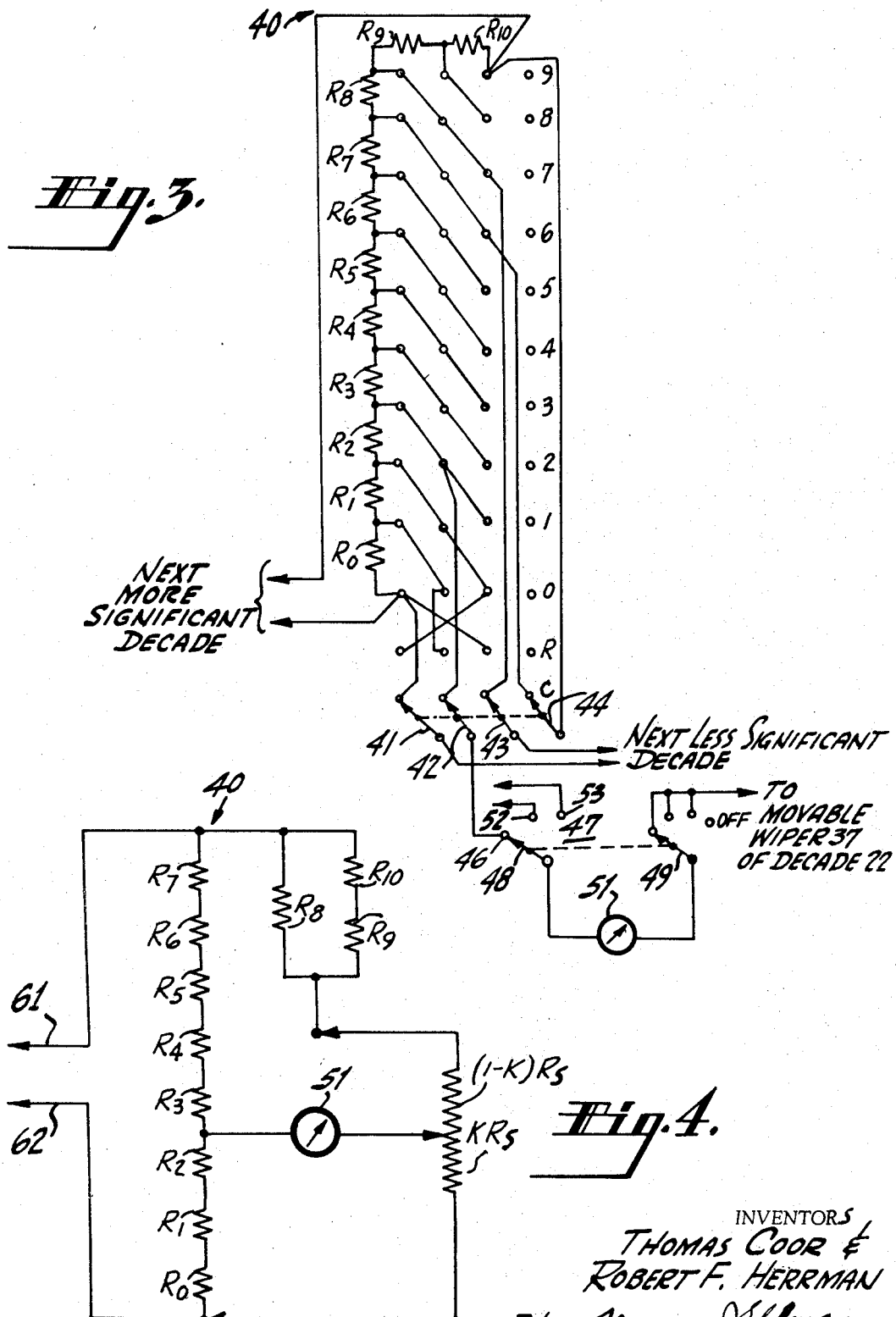

United States Patent Office 3,403,336
Patented Sept. 24, 1968

3,403,336
METHOD AND APPARATUS FOR PERIODICALLY CALIBRATING A PRECISION POTENTIOMETER
Thomas Coor, Princeton, and Robert F. Herrman, Burlington, N.J., assignors to Princeton Applied Research Corporation, Princeton Junction, N.J., a corporation of New Jersey
Filed June 21, 1965, Ser. No. 465,302
15 Claims. (Cl. 324—63)

ABSTRACT OF THE DISCLOSURE

A method of and the apparatus for periodically calibrating a precision potentiometer is provided wherein a select amount of resistance in one of the resistor banks thereof is connected as adjacent arms in a Wheatstone bridge and the remaining, less significant, resistor banks are connected as the other two adjacent arms of said Wheatstone bridge. According to a further aspect of this invention, further calibration is accomplished by connecting a select amount of resistance in one of the resistor banks of a precision potentiometer as two adjacent arms of a Wheatstone bridge and the remaining resistance of said one resistor bank as well as the remainder of the less significant resistor banks are connected as the other two adjacent arms of said Wheatstone bridge.

---

The present invention relates to a new and improved resistance measurement and calibration method and apparatus. More particularly, the present invention relates to a method and apparatus for resistance measurement which is capable of self-calibration.

For very accurate resistance measurements and for providing resistance ratio decades, a Kelvin-Varley potentiometer is sometimes use. This apparatus may also be used for providing desired output voltages related to particular input voltages.

One of the difficulties involved with any accurate measurement apparatus is a method for calibrating the apparatus. With the present invention, an arrangement is provided for calibrating the Kelvin-Varley potentiometer using the resistors and the decades already present in the potentiometer.

Accordingly, it is an object of the present invention to provide a new and improved apparatus for resistance measurement.

A second object of the present invention is to provide a new and improved arrangement for calibrating a resistance decade.

A further object of the present invention is to provide a new and improved arrangement for calibrating very accurate resistance decades without using any additional resistors beyond those already available in the resistor decade.

The novel features which are considered as characteristic for the invention are set forth in particular in the appended claims. The invention itself, however, both as to its construction and method of operation, together with additional objects and advantages thereof, will be best be understood from the following description of specific embodiments when read in connection with the accompanying drawings, in which:

FIGURE 3 is a schematic diagram of an actual resistance decade which is used in a Kelvin-Varley potentiometer incorporating the principles of the present invention; and FIGURE 4 is a schematic representation of one position of the potentiometer of FIGURE 3 showing the self-calibrating features of the present invention.

Figure 1:
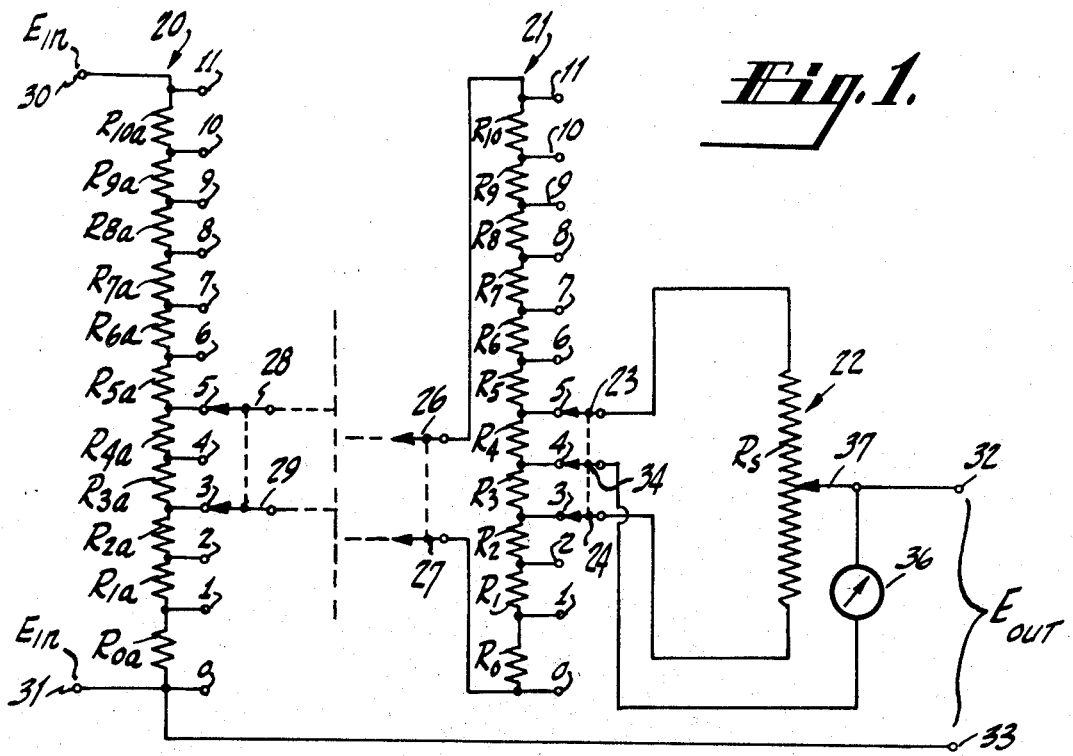
FIGURE 1 is a schematic representation of a Kelvin-Varley potentiometer showing a feature of the present invention for calibrating the potentiometer.

Referring to the drawings and more particularly to FIGURE 1, it can be seen that the Kelvin-Varley potentiometer includes a plurality of resistor decades. The left-hand decade in FIGURE 1, indicated by the numeral 20, is the decade of the most significant digit. The second decade 21 is a less significant digit decade, and the third decade shown in the form of potentiometer 22 in FIGURE 1 is the decade of the least significant digit.

The broken lines between decades 20 and 21 indicate that many more decades may be provided to produce the number of digits desired. One common form of Kelvin-Varley potentiometer has seven resistor decades. Each resistor decade has eleven equal resistors therein. Thus, the decade 21 has eleven resistors $R_0$, $R_1$, $R_2$, $R_3$, $R_4$, $R_5$, $R_6$, $R_7$, $R_8$, $R_9$ and $R_{10}$. The decade 20 has eleven resistors $R_{0a}$ to $R_{10a}$. Each of the resistors in a particular decade are equal to each other.

It can also be seen that the common terminals between adjacent resistors of each resistor decade are respectively connected to a series of terminals numbered 0–11. These terminals represent different switch contacts that cooperate with movable armatures of a manually operable switch. Thus, the terminals 0–11 of decade 20 cooperate with movable wipers or armatures 28 and 29 while armatures 23 and 24 cooperate with terminals 0–11 of decade 21. Armatures 23 and 24, as well as armatures 28 and 29, are spaced to bridge two resistors in a decade. For example, armature 23 is shown in contact with terminal 5 of decade 21 while armature 24 is in contact with terminal 3 for a typical switch position. Thus, the armatures 23 and 24 connect the series resistors $R_3$ and $R_4$ in parallel with the resistance of the decade 22. The resistance of the decade 22, shown in the form of a potentiometer, is the resistance $R_s$.

Resistance $R_s$ has a value equal to twice any one of the resistors in the resistor decade 21. Therefore, it can be seen that for any of the switch positions, the total effective resistance of a decade is the effective resistance of ten of its resistors. The dotted lines bridging the sliding armatures or wipers 23 and 24, and 28 and 29, indicate that these contacts always move together and always bridge two resistors. The position illustrated in FIGURE 1 is position #3 of each of the armatures of the switch.

In the usual Kelvin-Varley potentiometer, each of the resistors $R_0$–$R_{10}$ of decade 21 has a resistance which is ⅕ of that of each resistor of the next higher decade. Thus, the total effective resistance of the decade 21 will be 10/5 of the resistance of each resistor in the next higher decade. Again, this provides a total effective resistance of twice the resistance of each individual resistor from the next preceding decade which is the decade of the next more significant digit. Therefore, the total resistance of the decade 21 has the same effect on the next previous digit as the resistance of the potentiometer 22 had on the decade 21.

That is, the decade 21 is connected to sliding contacts or armatures 26 and 27 which bridge two individual resistors in series in the next previous decade (not shown). Since the total resistance between armatures 26 and 27 is effectively twice each individual resistor in the next more significant decade, the total resistance of the next more significant decade is then ten times each resistor.

Thus, the entire Kelvin-Varley slide or potentiometer has a series of resistor decades. Each decade has effectively a total resistance equal to twice that of each individual resistor in the next more significant decade. Since each decade bridges two individual resistors in series, the effective resistance of each resistor decade is ten times the resistance of each individual resistor in the decade. This is demonstrated in the decade 20, which is the decade of the most significant digit. The sliding armatures connected to the switch positions of the decade 20 are armatures 28 and 29. These armatures are also shown in position #3 of the switch but may, of course, be moved independently into any one of the ten positions shown for decade 20. Since the sliding contacts or armatures 28 and 29 move in unison, they always will bridge two individual resistors. In FIGURE 1, the armatures 28 and 29 are shown bridging resistors $R_{3a}$ and $R_{4a}$.

Therefore, the effective resistance of the total resistor decade 20 is ten times the resistance of any of the individual resistors in the decade.

The input to the decade 20 is across input terminals 30 and 31. If a particular resistance ratio is desired to be provided by the Kelvin-Varley potentiometer, or a particular voltage output is desired, these may be chosen by properly moving the sliding armatures for each decade into the desired position. Thus, the input voltage $E_{in}$ is applied across the input terminals 30 and 31. The voltage appearing at the right-hand portion of FIGURE 1, across output terminals 32 and 33, will depend on the combination of the settings of the sliding contacts or armatures for each of the decades of FIGURE 1.

The arrangement thus far described for FIGURE 1 is the conventional Kelvin-Varley potentiometer. It can be seen that the accuracy of the readings of Kelvin-Varley resistance decades depends on the accuracy of the resistors in the decades and, therefore, it is desirable to provide proper calibration procedures for these resistors.

In accordance with the present invention, a third wiper or movable armature is connected between two of the sliding armatures. This is shown in FIGURE 1 by the sliding armature 34 which is arranged to contact the switch terminal which lies between the terminals contacted by armatures 23 and 24. The sliding contact or wiper 34 is shown in contact with fixed terminal 4 arranged between resistors $R_3$ and $R_4$.

The armature 34 is connected to one side of a galvanometer 36, the other side of which is connected to the movable armature 37 of the resistor decade 22.

Figure 2:
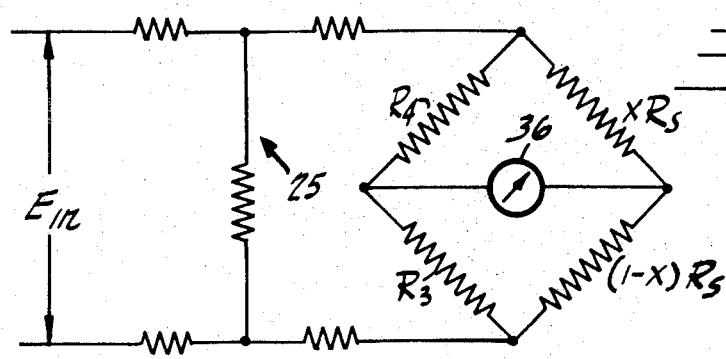
FIGURE 2 is a schematic representation of a Wheatstone bridge arrangement which is formed by a portion of the arrangement of FIGURE 1 in accordance with the present invention.

The addition of the third wiper or sliding contact 34 and the galvanometer 36 permits the ratio of resistors $R_4/R_3$ to be determined for the switch position illustrated. This is more clearly shown in FIGURE 2. In FIGURE 2, only that portion corresponding to the three wipers or sliding armatures and the added galvanometer are shown. Thus, the individual resistors $R_4$ and $R_3$ of the resistance decade 21 form two arms of a conventional Wheatstone bridge arrangement.

The remaining two arms of the bridge are formed by the potentiometer 22 which is the resistance decade of the least significant digit of the potentiometer arrangement of FIGURE 1. The respective portions of the resistance of the potentiometer 22 which are arranged in each of the arms of the Wheatstone bridge depends on the position of the sliding armature 37. Thus, in the upper right-hand portion of the Wheatstone bridge, the resistance of the arm is $xR_s$ while the lower arm is $(1-x)R_s$. The resistors of FIGURE 2 identified generally by the arrow 25 represent all preceding decades and resistors of decade 21 exclusive of resistors $R_3$ and $R_4$.

It can be seen from the arrangement of FIGURE 2 that the resistance ratio $R_4/R_3$ can readily be determined by adjusting the position of the movable wiper 37 until a null is established on the meter 36. By the same token, by moving the contacts 23, 24 and 34, which are mechanically connected together, anywhere from the 0 position in decade 21 to the position #9 of the decade, the respective resistance ratios of the adjacent resistors can be readily ascertained.

Thus, when the wipers are in position 0, the armature 24 is connected to the terminal 0; the armature 34 is connected to the terminal 1; and the armature 23 is connected to the terminal 2. In this position, when a null is established on the meter 36, the resistance ratio $R_1/R_0$ is obtained.

Similarly, in position 9 of the decade 21, the armature 24 is connected to terminal 9; the armature 34 is connected to the terminal 10; and the armature 23 is connected to the terminal 11. In this position, the resistance ratio $R_{10}/R_9$ is determined when the meter 36 provides a null reading. The ratio of adjacent resistors in any one of the decades is similarly determined by adjusting all of the less significant decades of the potentiometer until a null is indicated. The readings of these latter decades, amended by the corrections previously established, will thus measure all of the ratios.

In the embodiment discussed thus far, it has been assumed that potentiometer 22 is the decade of the least significant digit. It should be appreciated that decade 22 can actually represent all of the decades of less significant digits to the decade being calibrated. The adjustment of the armature 37 would be accomplished by adjusting each of the armatures in these decades of less significant digits.

For example, assume there are seven decades for the Kelvin-Varley potentiometer and the third decade is being evaluated. Assume that the armatures of the decade being evaluated are in position 4. For this arrangement, the lowermost slidable armature will be in contact with terminal 4, the central slidable armature which is added in accordance with the principles of the present invention will be in contact with terminal 5, and the uppermost slidable armature will be in contact with terminal 6.

If, in this position #4, the remaining decades adjusted to null read 5, 0, 0, 2, and no correction for this reading is necessary, then the ratio:

$$\frac{R_5}{R_4} = \frac{10,000 - 5002}{5002} = \frac{4998}{5002} = 0.9992$$

As will be shown subsequently, the ratio of the adjacent resistors in any position of any of the decades can be determined in this manner by connecting the additional wiper equivalent to the slidable armature 34 of FIGURE 1 in the position between the conventional regular wipers equivalent to armatures 23 and 24. In this manner any of the ratios can be calibrated using the corrections previously established for the less significant decade resistors.

A practical way of accomplishing this purpose is shown in FIGURE 3. In FIGURE 3, a single decade 40 is shown representing one of a series of decades in the Kelvin-Varley potentiometer or divider. It should be realized that the remaining decades, except for the decade of least significant digit, may be made in a similar manner. The decade of the least significant digit can be a slide wire as in FIGURE 1.

It can be seen that the ten positions 0–9 are provided as well as two additional positions R and C. Each of the decade positions has four fixed contacts which cooperate with four sliding contacts 41, 42, 43 and 44 respectively. The sliding contacts or armatures 41–44 are mechanically connected together to move in unison as indicated by the dotted line connected therebetween. Such a switch arrangement may be consdered a four-pole twelve position switch.

The armatures 41–44 are shown in the C or calibrate position. The armatures 41 and 43 correspond substantially to the armatures 24 and 23, respectively, of FIGURE 1, while the armature 42 corresponds to the armature 34 of FIGURE 3. It can be seen that the armature 42 is shown connected by a conductor to a fixed contact 46 of a switch 47. Switch 47 is shown as a four-position switch having two poles corresponding to rotatable or movable armatures 48 and 49.

Connected between the armatures 48 and 49 is a galvanometer 51 corresponding to the galvanometer 36 of FIGURE 1. In the illustrated position, the galvanometer 51 is connected for purposes of measuring the resistance ratio of the resistance decade 40.

It can be seen that the armatures 41 and 43 of the decade switch are connected to the next less significant decade which would be equivalent to the connection shown in FIGURE 1 wherein armatures 23 and 24 are connected to the opposite ends of the equivalent potentiometer 22. Similarly, the input connections to the resistor decade 40 are connected between the lower end of the resistor $R_0$ and the upper end of the resistor $R_{10}$. This would be equivalent to connections to the sliding contacts 26 and 27 of the decade 21 of FIGURE 1.

Thus it is seen that in the arrangement of FIGURE 3, the output from the next more significant decade is applied across the total resistance of the resistance decade 40 and the output of the resistance decade 40 is taken across any two of the resistors of the eleven resistors in the resistance decade 40.

This output is taken from the sliding contacts 41 and 43 and applied across the total resistance of the next less significant decade. Since the individual resistors in each decade are still maintained in the conventional Kelvin-Varley potentiometer arrangement, it can be seen that each decade still exhibits a total effective resistance which is ten times the resistance of each individual resistor in the decade.

In operation, when the armatures 48 and 49 are in the off position (most clockwise) shown in FIGURE 3, each of the decades operate in accordance with conventional Kelvin-Varley potentiometer operation. The R and C positions, illustrated in FIGURE 3, are not used, and only positions 0–9 are used for the conventional decade purposes.

For self-calibration, in accordance with the principles of the present invention, the selector switch 47 of FIGURE 3 is moved to the illustrated position wherein the movable armature 48 is in contact with the fixed contact 46. The decade switch of the resistance decade 40, having the four slidable contacts 41–44, are moved between the positions R, 0, 1, 2, 3, 4, 5, 6, 7, 8, 9, and C.

For each of these positions, the corrections to the actual reading of the resistance are determined. The switch 47 is then moved into the next position wherein the movable armature 48 contacts the fixed contact 52. This fixed contact 52 is connected (not illustrated) to the next more significant decade to decade 40. It would be connected to the armature corresponding to the slidable armature 42 of the decade 40. The calibration procedure would then be repeated using the corrected readings for the resistors of the resistance decade 40. The decade 40 would now become a part of the equivalent potentiometer 22.

Similarly, the selector switch 47 would then be moved so that the movable armature 48 would be in contact with the fixed contact 53. The fixed contact 53 is connected (not illustrated) to the second more significant decade, from the decade 40. Again, the slidable contacts for that particular decade are moved between the respective ten positions 0–9 and positions R and C to obtain the proper resistor readings. The corrected readings for decade 40 and the next more significant decade are of course used in determining the corrected readings for the next higher decade. By having enough fixed contacts on the switch 47 to account for each of the desired decades in the Kelvin-Varley potentiometer, it is possible to calibrate all of the resistors up to the decade of the most significant digit.

In the discussion thus far, the eleven resistors of each decade have been calibrated with respect to each other but not with respect to the resistors in adjacent decades. In accordance with the principles of the present invention, in order to determine the ratio of $R_s$ to any one of the resistors in the decade, where $R_s$ is the resistance of the next less significant decade, one or more of the resistors in the decade are used to form portions of three arms of the Wheatstone bridge and a portion of the resistance $R_s$ is used as the fourth arm of the Wheatstone bridge.

This corresponds to the position C shown in FIGURE 3 with respect to the decade 40. With the movable armatures 41–44 in the position C, as illustrated in FIGURE 3, the resistors in the decade 40 and the galvanometer 51 together with the resistance $R_s$ of the next less significant decade take the positions shown in FIGURE 4.

In FIGURE 4, the input from the next more significant decade is applied across movable wipers 61 and 62 to resistors $R_0$–$R_7$. Thus, the Wheatstone bridge arrangement of FIGURE 4 includes in the upper left arm of the bridge resistors $R_3$, $R_4$, $R_5$, $R_6$ and $R_7$. The lower left arm of the bridge includes resistors $R_0$, $R_1$ and $R_2$. The upper right arm of the Wheatstone bridge includes resistors $R_9$ and $R_{10}$ in series, with this series combination being connected in parallel with the resistor $R_8$. This parallel combination is connected in series with a portion $(1-K)R_s$ of the resistance of the next less significant decade $R_s$ to form the upper right arm of the bridge. The remaining portion $KR_s$ forms the lower right arm.

For a null reading on the meter 51, the following relationships exist:

$$\frac{KR_s}{R_s+\frac{R_8(R_9+R_{10})}{R_8+R_9+R_{10}}}=\frac{R_0+R_1+R_2}{R_0+R_1+R_2+R_3+R_4+R_5+R_6+R_7}$$

wherein K is known from application of the method to previous decades. Thus, the resistance $R_s$ can be computed in terms of $R_0$. It is now possible to compute for the sub-potentiometer which includes the decade 40 the true ratio of the output to the input for each setting of the decade. This is true since the relative effect of $R_s$ is now known.

Once the respective ratio of each of the individual resistors of each of the decades is determined and the resistance $R_s$ of the next less significant decade is determined, all of the ratios are known and the Kelvin-Varley potentiometer is calibrated. It should be realized that the calibrated values of each decade are used to calibrate the next more significant decade and the process is completed until the most significant decade has been calibrated.

At this point, the true value of the ratio of the output voltage to the input voltage can be determined from the decade settings and the corrections previously established. It should be realized that it is not possible to obtain the absolute value of any of the resistors, but this is not important since only the knowledge of the ratios is required when using a Kelvin-Varley potentiometer as a ratio standard.

Referring again to FIGURE 3, an additional advantageous feature of the arrangement shown therein will be described. It can be seen that the position R is identical to the position 0 on the switch positions for the decade 40, with the exceptions that the connections to wipers 41 and 43 are reversed in position R from that of position 0. That is, in position 0, the slidable armature 41 is connected to the lower end of the resistor $R_0$ and the slidable armature 43 is connected to the upper end of the resistor $R_1$. In the position R of the switch, the movable armature 41 is connected to the upper end of the resistor $R_1$ while the movable armature 43 is connected to the lower end of the resistor $R_0$. This allows a ready correction to be established for error in the potentiometer which comprises all less significant decades.

For example, the errors in the third decade are read by the potentiometer made up from the fourth to the last decade. In the third decade, assume that the ratio $R_1/R_0$ equals .9992. If the following decades are perfect, their dials should give a reading of 5, 0, 0, 2 for a null with the third decade switch in position 0. However, if the following decades are inaccurate, they may read 5, 0, 0, 1 for this condition.

If this error escapes detection, all of the ratio readings and subsequent calculated corrections will be in error. However, because of the R position, the third decade switch can be moved into this position and the ratio $R_0/R_1$ can be read. Under the above described condition, the ratio $R_0/R_1$ equals 1.0008 will then be read. The inaccurate potentiometer will then read 4, 9, 9, 7. This reading is averaged with that obtained in position 0 and subtracted from 5, 0, 0, 0 to give a correction factor 0, 0, 0, 1 which, when added to the readings obtained in the 0–9 and C positions, provides the correct reading.

It should be appreciated that it is not essential that the self-calibrated feature be built into each and every one of the resistance decades of the Kelvin-Varley potentiometer. Rather, for example, it is possible to use the advantageous features of the present invention in a seven decade Kelvin-Varley potentiometer wherein only the four most significant decades will have the self-calibrating features therein.

Similarly, it is not essential that the determination of the resistance R be carried out solely in the manner shown in the Wheatstone bridge arrangement of FIGURE 4. It is possible to use other arrangements of the string of resistors in the decade to achieve this purpose. For example, one end of the galvanometer may be connected between resistor $R_0$ and $R_1$ and the upper left-hand arm portion of the bridge would then be resistors $R_1$ and $R_2$. The right-hand arm of the Wheatstone bridge would include resistors $R_3$–$R_6$ in series and resistors $R_7$–$R_{10}$ in series. These two series combinations would then be connected in parallel with each other to form the right-hand portion of the bridge together with the resistance $R_s$ of the next less significant digit.

Other arrangements are also possible for this purpose, and each of them utilize the resistors already present in the Kelvin-Varley potentiometer for the purpose of calibrating the resistance $R_s$ in terms of the other resistors in the decade.

Thus, the above arrangements provide apparatus for calibrating the various decades in the Kelvin-Varley potentiometer by providing the proper interconnections between the resistors already present in the decade and such calibrations may be made by properly adjusting the switch positions and the decade settings.

In the illustrated embodiments, the Kelvin-Varley potentiometer has been shown with the resistors of a decade connected directly across two resistors of a preceding decade. In practice, the resistors of the decade may be connected in parallel with a resistor $R_p$. This permits conventional size resistors to be used with all of the decades. That is, without a resistor $R_p$ connected in shunt with all or some of the decades, in a multi-decade potentiometer, the decade of the most significant digit would have large resistors while the decade of the least significant digit would have very low value resistors. For example, in a seven-decade divider $R_7 = R_1 \times (1/5)^6$ or $$R_7/R_1 = 1/15,625$$

Thus, the decades are often made with resistors of equal values with a resistor connected in parallel so that the proper relationship between the resistance of adjacent decades exits.

What is claimed is:

1. The method of periodically calibrating a precision potentiometer having a plurality of resistance decades extending from the decade of the most significant digit to the decade of the least significant digit, The opposite ends of the decade of the most significant digit being adapted for connection across a source of potential, the decade of the least significant digit being a potentiometer device, having movable wiper means adapted for connection to one terminal of a null indicating means the remaining decades having resistance tap means therein defining resistance values of substantially equal value within a given decade and having a pair of movable contacts connected to the opposite ends thereof and selectively to the decade of the next more significant digit, comprising the steps of: connecting any two resistance tap means separated only by a single resistance tap means therebetween in one of the decades as two adjacent arms of a Wheatstone bridge, connecting the resistance of all of the decades of lesser significant digits across said two resistance tap means as the remaining two arms of said Wheatstone bridge connecting the junction between said two adjacent arms to a second terminal of said null indicating means, adjusting said wiper until a null is established and repeating the said steps of connecting for another of said any two resistance tap means separated only by a single resistance tap means therebetween.

2. The method of periodically calibrating precision potentiometer apparatus having a plurality of resistance decades of predetermined significance therein including a potentiometer device having movable wiper means adapted for connection with one terminal of a null indicating means, said precision potentiometer being adapted for energization by a source of potential, the method comprising the steps of: connecting a selected resistance in one of the decades as two adjacent arms of a Wheatstone bridge and connecting the remaining resistance of said one decade in a preselected relationship with the resistance of all of the decades of lesser significant digits to said one decade in a preselected relationship with the resistance of stone bridge, connecting a second terminal of said null indicating means to a junction intermediate said two adjacent arms and adjusting said wiper until a null is established.

3. In precision potentiometer apparatus having a plurality of resistance group; a plurality of sequentially arranged resistance tap means in each of said resistance groups, said resistance tap means in each group having a preselected value with respect to the values of the resistance tap means of the other groups; movable contact means in each of said resistance groups arranged to selectively connect across any two resistance tap means separated only by a single resistance tap means therebetween; a potentiometer means having fixed end terminal means and a variable position terminal means intermediate said end terminal means; means connecting said movable contact means of a first resistance group respectively across said fixed end terminals; and means connecting said movable contact means of the other resistance group across the entire resistance of said first resistance group as well as that of other resistance groups of less significance than itself, the improvement comprising a third movable contact means in combination with at least one of said movable contact means, said third movable contact means arranged to connect to said single resistance tap means which separates said any two resistance tap means.

4. The apparatus of claim 3 additionally comprising the improvement of a null detector and means for connecting said null detector at a first terminal thereof of said variable position terminal means intermediate said end terminal means of said potentiometer means and at a second terminal thereof to said third movable contact means and thus to said single resistance tap means.

5. The apparatus of claim 4 wherein said third movable contact means in combination with at least one of said movable contact means is mechanically coupled thereto for movement therewith, said third movable contact means thereby contacting said single resistance tap means which separates said any two resistance tap means whenever said at least one movable contact means is connected to said any two resistance tap means.

6. The apparatus of claim 5 wherein the resistance intermediate said any two resistance tap means in contact with said movable contact means having said third movable contact mechanically coupled thereto forms a first and second arm of a Wheatstone bridge and the resistance of said potentiometer means intermediate said end terminal means forms a third and fourth arm of a Wheatstone bridge.

7. The apparatus of claim 5 wherein said third movable contact means which is mechanically coupled to said at least one movable contact means constitutes the bridging and pole portions of a multiposition switch, said multiposition switch having one position for each two resistance tap means separated by only a single resistance tap means therebetween and at least one additional position.

8. The apparatus of claim 7 wherein said at least one additional position constitutes a calibrate position whereby the resistance tap means of the resistance group associated with said switch may be calibrated with respect to at least said potentiometer means.

9. The apparatus of claim 8 wherein said multiposition switch in said calibrate position establishes a bridge relationship whereby the resistance between a first plurality of resistance tap means of said associated resistance group forms a first arm thereof, the resistance between a second plurality of resistance tap means of said associated resistance group forms a second arm thereof, the resistance between a third plurality of resistance tap means of said associated resistance group forms a portion of a third arm thereof, and a portion of the resistance of said potentiometer means forms the fourth arm thereof.

10. The apparatus of claim 5 additionally comprising several third movable contact means, each of said several third movable contact means being associated with one of said movable contact means, and means for selectively connecting each of said several third movable contact means to said second terminal of said null detector.

11. The apparatus of claim 10 wherein each of said several third movable contact means is mechanically coupled to its respective movable contact means and constitutes the bridging and pole portions of a selectable multiposition switch, said multiposition switch having one position for each two resistance tap means separated by only a single resistance tap means therebetween and at least one additional position.

12. The apparatus of claim 11 wherein said at least one additional position constitutes a calibrate position whereby the resistance tap means of resistance group associated with a given selectable multiposition switch may be calibrated with respect to at least said potentiometer means as well as any less significant resistance group which may be present.

13. The apparatus of claim 12 wherein a given multiposition switch associated with a given resistance group, when selected and in said calibrate position establishes a bridge relationship whereby the resistance between a first plurality of resistance tap means of said associated resistance group forms a first arm thereof, the resistance between a second plurality of resistance tap means of said associated resistance group forms a second arm thereof, the resistance between a third plurality of resistance tap means of said associated resistance group forms a portion of a third arm thereof, and a portion of the resistance of said potentiometer forms a portion of the fourth arm thereof.

14. The apparatus of claim 13 wherein each of said selectable multiposition switches has a second additional position, said second additional position establishing a Wheatstone bridge wherein the resistance intermediate two previously defined resistance tap means separated only by a single tap means therebetween of the associated resistance group forms a first and second arm of a Wheatstone bridge and the resistance of said potentiometer as well as the resistance of any less significant resistance group means forms a third and fourth arm of a Wheatstone bridge, the ratio of the first and second arms of said Wheatstone bridge when said multiposition switch is in said second additional position being the reciprocal of the ratio of the first and second arms of the Wheatstone bridge formed when said multiposition switch is in the normal position for said two previously defined resistance tap means separated only by a single tap means therebetween.

15. The apparatus of claim 14 wherein the precision potentiometer apparatus is a Kelvin-Varley potentiometer, the plurality of resistance groups constitute decades and each decade has twelve resistance tap means therein defining eleven dicrete resistance values.

References Cited

UNITED STATES PATENTS

| | | | |
|---|---|---|---|
| 2,099,349 | 11/1937 | Rosebury | 324—63 |
| 2,123,142 | 6/1938 | McMaster | 324—63 XR |
| 2,419,952 | 5/1947 | Konicek et al. | 324—62 XR |
| 2,648,819 | 8/1953 | Gustafsson | 324—62 |
| 2,886,677 | 5/1959 | Bourns | 324—99 XR |
| 2,926,321 | 2/1960 | Stein et al. | 338—137 |
| 3,297,939 | 1/1967 | Dauphinee | 323—43.5 |

FOREIGN PATENTS 759,264   10/1956   Great Britain.

ARCHIE R. BORCHELT, *Primary Examiner.*

E. E. KUBASIEWICZ, *Assistant Examiner.*